US011334393B2

(12) United States Patent
Purushothaman et al.

(10) Patent No.: US 11,334,393 B2
(45) Date of Patent: May 17, 2022

(54) RESOURCE CLUSTER CHAINING ARCHITECTURE

(71) Applicant: Bank of America Corporation, Charlotte, NC (US)

(72) Inventors: Sasidhar Purushothaman, Hyderabad (IN); Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 289 days.

(21) Appl. No.: 16/736,507

(22) Filed: Jan. 7, 2020

(65) Prior Publication Data

US 2021/0208947 A1 Jul. 8, 2021

(51) Int. Cl.
*G06F 9/50* (2006.01)
*G06F 11/34* (2006.01)

(52) U.S. Cl.
CPC ............ *G06F 9/5072* (2013.01); *G06F 9/505* (2013.01); *G06F 9/5066* (2013.01); *G06F 11/3457* (2013.01)

(58) Field of Classification Search
None
See application file for complete search history.

(56) References Cited

U.S. PATENT DOCUMENTS 5,889,956 A 3/1999 Hauser et al.
6,260,068 B1 7/2001 Zalewski et al.
6,438,537 B1 8/2002 Netz et al.
6,466,559 B1 10/2002 Johansson et al.
6,675,278 B1 1/2004 Chowdhary et al.
6,728,895 B1 4/2004 Nelson
(Continued)

FOREIGN PATENT DOCUMENTS

EP 2056515 A1 5/2009
EP 2176751 A2 4/2010
(Continued)

OTHER PUBLICATIONS

Purushothaman, S., "Dynamic Resource Clustering Architecture," U.S. Appl. No. 16/736,458, filed Jan. 7, 2020, 36 pages.

*Primary Examiner* — Eric C Wai

(57) ABSTRACT

A device configured to receive requirements that identifies hardware operating characteristics and to determine a performance metric for the requirements. The device is configured to generate a set of resource cluster configurations that each identify a set of hardware resources and a set of algorithms. The device is further configured to identify a first resource cluster configuration having a first performance value with the highest performance value from among the set of resource cluster configurations. The device is further configured to combine the first resource cluster configuration with a second resource cluster configuration, and to determine a second performance value for the combined resource cluster configuration. The device is further configured to modify the combined resource cluster configuration when the second performance value is less than the first performance value and to output the combined resource cluster configuration when the second performance value is greater than the first performance value.

17 Claims, 4 Drawing Sheets

(56) References Cited

U.S. PATENT DOCUMENTS

| | | |
|---|---|---|
| 6,766,348 B1 | 7/2004 | Combs et al. |
| 6,865,393 B1 | 3/2005 | Baum et al. |
| 7,225,223 B1 | 5/2007 | McCarthy et al. |
| 7,530,068 B2 | 5/2009 | Clark et al. |
| 7,558,859 B2 | 7/2009 | Kasiolas et al. |
| 7,707,578 B1 | 4/2010 | Zedlewski et al. |
| 7,711,821 B2 | 5/2010 | Pendarakis et al. |
| 7,721,292 B2 | 5/2010 | Frasier et al. |
| 7,765,552 B2 | 7/2010 | Miller et al. |
| 7,788,671 B2 | 8/2010 | Black-Ziegelbein et al. |
| 8,245,230 B2 | 8/2012 | Danko |
| 8,307,362 B1 | 11/2012 | Gong et al. |
| 8,387,052 B2 | 2/2013 | Dodge et al. |
| 8,429,276 B1 | 4/2013 | Kumar et al. |
| 8,495,646 B2 | 7/2013 | Uchida |
| 8,589,920 B2 | 11/2013 | Tene et al. |
| 8,706,798 B1 | 4/2014 | Suchter et al. |
| 8,762,999 B2 | 6/2014 | Johnson et al. |
| 8,813,089 B2 | 8/2014 | Baruch et al. |
| 8,825,858 B1 | 9/2014 | Atchity et al. |
| 8,898,402 B1 | 11/2014 | Stronge |
| 8,943,011 B2 | 1/2015 | Gong et al. |
| 9,008,807 B2 | 4/2015 | Shapiro et al. |
| 9,009,156 B1 | 4/2015 | Jiang et al. |
| 9,081,618 B2 | 7/2015 | Kiehn |
| 9,122,398 B2 | 9/2015 | Gupta et al. |
| 9,164,802 B2 | 10/2015 | Netto |
| 9,336,147 B2 | 5/2016 | Kotla et al. |
| 9,348,391 B1 | 5/2016 | Marr et al. |
| 9,363,197 B2 | 6/2016 | Waldspurger |
| 9,442,763 B2 | 9/2016 | Chai |
| 9,497,136 B1 | 11/2016 | Ramarao et al. |
| 9,628,362 B2 | 4/2017 | Vasseur et al. |
| 9,722,866 B1 | 8/2017 | Brooker et al. |
| 10,120,724 B2 | 11/2018 | Badjatia et al. |
| 10,176,435 B1 | 1/2019 | Sarkar et al. |
| 10,210,470 B2 | 2/2019 | Datta Ray |
| 10,223,131 B1* | 3/2019 | Lieberman .......... G06F 11/3414 |
| 2005/0132362 A1 | 6/2005 | Knauerhase et al. |
| 2006/0047813 A1* | 3/2006 | Aggarwal .......... H04L 67/1029 |
| | | 709/226 |
| 2006/0184938 A1 | 8/2006 | Mangold |
| 2007/0266388 A1 | 11/2007 | Jackson |
| 2011/0307901 A1* | 12/2011 | Blanding .............. G06F 9/5061 |
| | | 718/104 |
| 2020/0110691 A1* | 4/2020 | Bryant ................. G06F 9/5077 |

FOREIGN PATENT DOCUMENTS

| | | |
|---|---|---|
| GB | 2474666 A | 4/2011 |
| GB | 2506195 A | 3/2014 |

\* cited by examiner

RESOURCE CLUSTER CHAINING ARCHITECTURE

TECHNICAL FIELD

The present disclosure relates generally to processing architectures, and more specifically to a resource cluster chaining architecture.

BACKGROUND

Existing computer systems may be configured to allocate hardware resources and/or software resources to network devices within the system. For example, a computer system may temporarily allocate a set of resources to a network device so that the network device can perform some kind of operation, for example processing a data set. Managing and allocating a system's resources poses a technical challenge because systems have a limited number of hardware resources and software resources. In some cases, existing computer systems may be configured to allocate resources based on information provided by a user. For example, a user may specify which resources it needs. In this case, existing computer systems lack the ability to analyze the requested configuration of resources to determine whether the configuration efficiency meets the user's needs. For instance, the requested configuration of resources may lack the capability to meet the user's performance requirements or specification. In some instances, the user may request more resources than are necessary to meet their needs. In this case, the requested resources are unavailable to other network devices until they are released by the network device. This limits a system's ability to provide support and resources for other network devices.

SUMMARY

The system disclosed in the present application provides a technical solution to the technical problems discussed above by dynamically generating and evaluating different resource cluster configurations. The disclosed system provides several practical applications and technical advantages which include a process for efficiently identifying and allocating available hardware resources and software resources. This process improves the operation of the system by ensuring that a suitable amount and type of resources are allocated to a network device to satisfy their performance needs without over-allocating the available resources, which would limit the system's ability to provide resources to other network devices. The disclosed system also provides a process for discovering new combinations of hardware resources and software resources that satisfy a set of requirements. This process improves the operation of the system by enabling the system to learn new hardware and software resource configurations that can be allocated to a network device to satisfy the network device's performance needs. The discovered configurations may reduce the amount of resources that are consumed and may provide improved performance benefits over other previously defined (e.g. user-defined) configurations.

In one embodiment, a device is configured to generate a resource cluster configuration that identifies a set of hardware resources and software resources that can be allocated to a network device to satisfy a set of requirements specified by a user. The device is configured to generate a set of different configurations by randomly selecting a combination of hardware resources and software resources (e.g. algorithms) that are currently available. By randomly selecting resources, the device is able to discover new combinations of resources that can satisfy the set of requirements specified by the user. After generating the set of resource cluster configurations, the device then evaluates each configuration to determine which configuration provides the best performance. After identifying a resource cluster configuration that provides the best performance, the device then uses a feedback loop to determine whether improved performance can be achieved by modifying the combination of hardware resources and software resources in the identified resource cluster configuration. Through this process the device is able to discover a unique combination of hardware and software resources that can be allocated to the network device to satisfy their performance needs.

In another embodiment, a device is configured to generate a resource cluster chain by combining hardware resources and software resources from two or more resource cluster configurations. In this case, the device is able to provide improved performance and efficiency by chaining together individual resource cluster configurations to provide a unique configuration that satisfies a set of requirements specified by a user. For example, the device may generate a resource cluster chain that includes multiple instances of the same resource cluster configuration (i.e. the same hardware and software resources) which would enable a network device to perform some processes in parallel. In this configuration, the device generates a set of resource cluster configuration by randomly selecting different combinations of hardware and software resources. The device then identifies a resource cluster configuration that provides the best performance based on the set of requirements. The device uses a feedback loop to combine the identified resource cluster configuration with other resource cluster configurations to determine whether improved performance can be achieved by using different combinations of hardware and/or software configurations. Through this process the device is able to chain together multiple resource cluster configurations to discover a unique combination of hardware and software resources that can be allocated to the network device to satisfy their performance needs.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Resource Clustering System Overview

Figure 1:
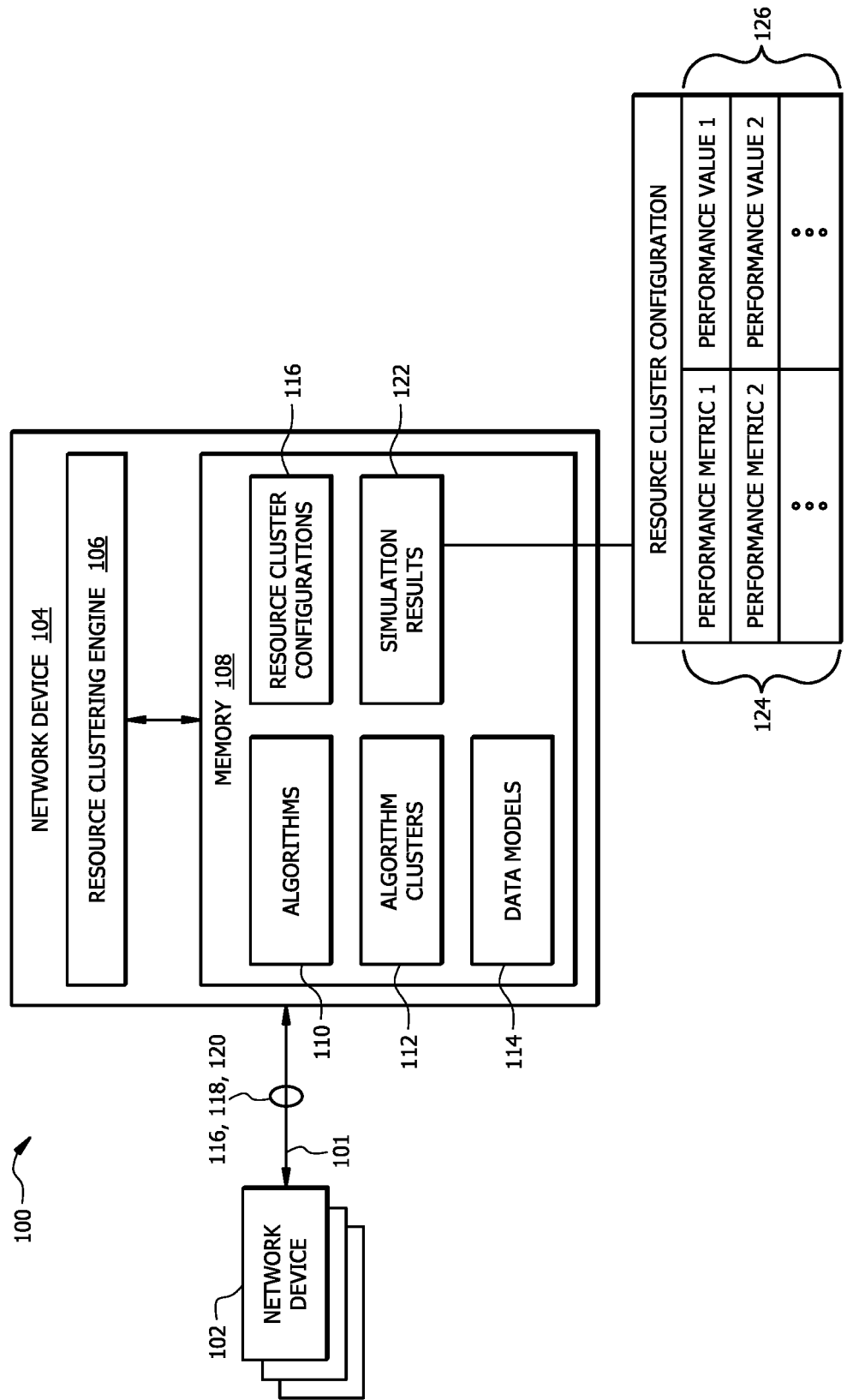
FIG. 1 is a schematic diagram of resource clustering system configured to generate and manage resource clusters.

FIG. 1 is a schematic diagram of resource clustering system 100 configured to generate and manage resource clusters of hardware and software resources. In one embodiment, the resource clustering system 100 comprises a network device 104 that is in signal communication with one or more other network devices 102 in a network 101. The resource clustering system 100 may be configured as shown or in any other suitable configuration.

The network 101 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 101 may be configured to support any suitable type of communication protocol as would be appreciated by one of ordinary skill in the art.

In one embodiment, the network device 104 comprises a resource clustering engine 106 that is generally configured to receive a resource cluster request 118 from another network device 102, to generate a resource cluster configuration 116 based on the resource cluster request 118, and to send the resource cluster configuration 116 to the network device 102. Examples of other network devices 102 include, but are not limited to, computers, laptops, mobile devices (e.g. smart phones or tablets), servers, clients, or any other suitable type of device. As an example, a network device 102 may send a resource cluster request 118 to request a resource cluster configuration 116 for allocating system resources to the network device 104. For instance, the network device 102 may request access to a combination of hardware and/or software resources to perform an operation. The resource cluster request 118 comprises one or more requirements 120 specified by a user. Examples of requirements 120 include, but are not limited to, a minimum number of hardware resources, a maximum number of hardware resources, hardware restrictions, software or algorithm restrictions, required algorithms, response times, latency times, packet size limitations, bandwidth limitations, and any other suitable type of requirement or limitation.

In response to receiving a resource cluster request 118, the network node 104 generates a resource cluster configuration 116 based on the requirements 120 identified by the resource cluster request 120. An example of the network device 104 performing this operation is described in more detail below in FIG. 2. A resource cluster configuration 116 identifies one or more hardware resources and/or one or more software resources that can be allocated to the network device 102 to form a resource cluster that satisfies the requirements 120 specified in the resource cluster request 118. Examples of hardware resources include, but are not limited to, hardware processors, memory, networking resources, and any other suitable type of hardware. Examples of software resources include, but are not limited to, algorithms 110, algorithm clusters 112, data models 114, applications, virtual machines, and any other suitable type of software resources. Algorithms 110 comprise functions or applications that are configured to perform a particular operation on data. Algorithm clusters 112 are combinations of two or more algorithms 110. For example, a set of algorithms 110 may be chained together in particular order to perform an operation on data. Data models 114 comprise a set of data that may be used by an algorithm 110 or an algorithm cluster 112 for performing an operation on data. Examples of data models 114 include, but are not limited to, network information, historical system performance information, predicted system performance information, user information, or any other suitable type of data.

In one embodiment, the network device 104 is configured to generate a resource cluster configuration 116 for a resource cluster chain. An example of the network device 104 performing this operation is described in more detail below in FIG. 3. A resource cluster chain comprises two or more resource clusters. For example, a resource cluster chain may comprise a first resource cluster and a second resource cluster where the first resource cluster comprises a first set of hardware resources and a first set of software resources (e.g. algorithms 110) and the second resource cluster comprises a second set of hardware resources and a second set of software resources. In some cases, a resource cluster chain may include multiple instances of the same resource cluster. Generating a resource cluster chain may improve performance and efficiency when allocating resources to a network node 102 by leveraging and combining previously determined resource cluster configurations 116.

The network device 104 further comprises a memory 108 configured to store algorithms 110, algorithm clusters 112, data models 114, resource cluster configuration 116, simulation results 122, and/or any other suitable type of data. Simulation results 122 may comprise information about performance metrics 124 and corresponding performance values 126 for different resource cluster configurations 116. In one embodiment, the memory 108 may be a device that is external from the network device 104. For example, the memory 108 may be a database, a repository, a data store, a server, a network attached storage (NAS) device, a computing device, a shared folder, or any other suitable type of network device. Additional information about the hardware configuration of the network device 104 is described in FIG. 4.

Resource Clustering Process

Figure 2:
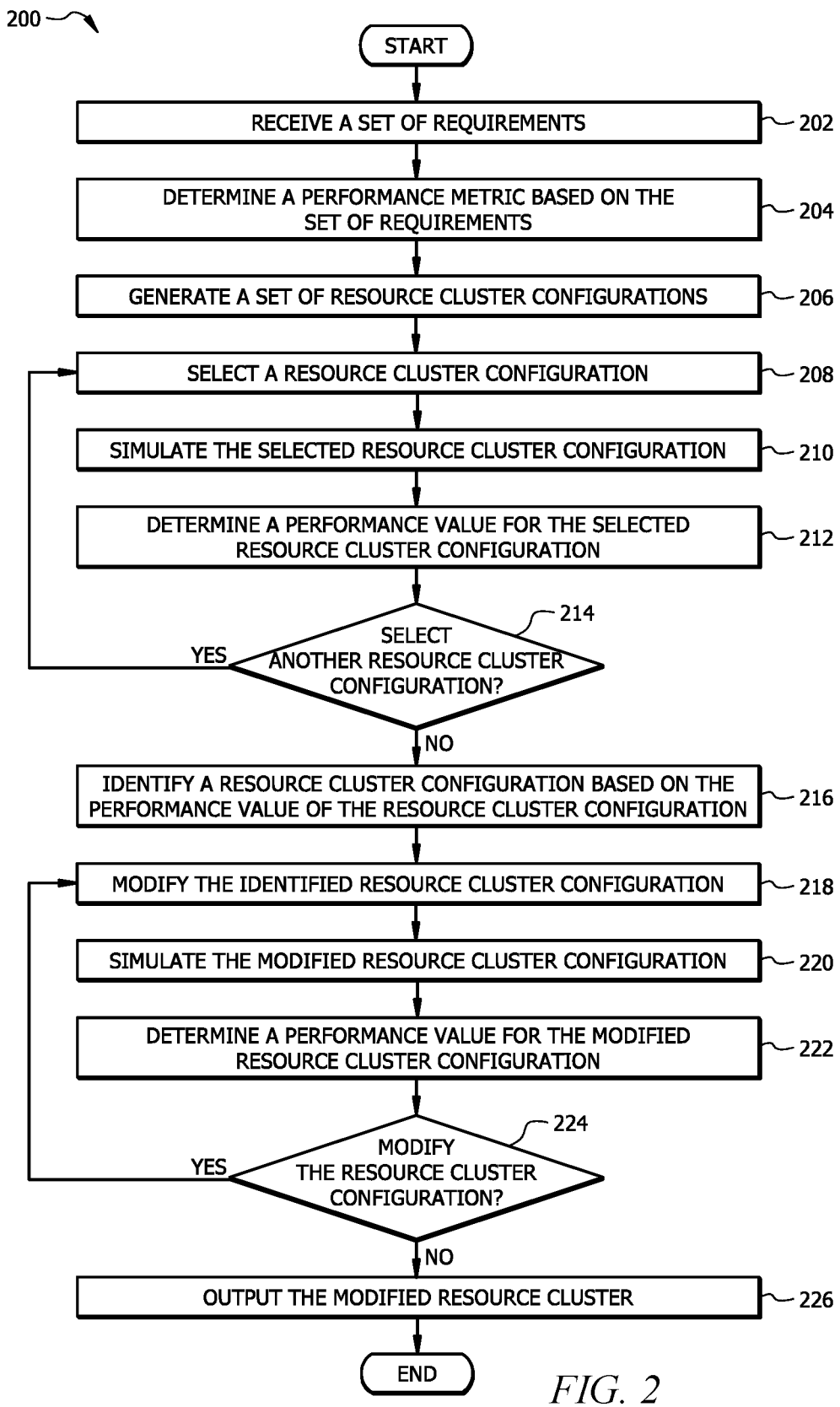
FIG. 2 is a flowchart of an embodiment of a resource clustering method.

FIG. 2 is a flowchart of an embodiment of a resource clustering method 200. The network device 104 may employ method 200 to generate a resource cluster that satisfies a set of requirements 120 specified by a user. For example, a network device 102 may send a resource cluster request 118 to the network device 104 to request a resource cluster. The resource cluster comprises one or more hardware resources and/or one or more software resources (e.g. algorithms 110) that can be allocated to the network device 102 and used by the network device 102.

At step 202, the resource clustering engine 106 receives a set of requirements 120. For example, the resource clustering engine 106 may receive the set of requirements 120 from a resource cluster request 118 that is sent to the network device 104. The set of requirements 120 may identify hardware and/or software operating characteristics. For example, the set of requirements 120 may identify a minimum number of hardware resources, a maximum number of hardware resources, required hardware, hardware restrictions, software or algorithm restrictions, required algorithms, response times, latency times, packet size limitations, bandwidth limitations, and/or any other suitable type of requirement or limitation. For instance, the set of requirements 120 may specify a minimum amount of memory space, a minimum number of processors, a minimum response time, and a maximum packet size. In other examples, the set of requirements 120 may identify any other suitable type or combination of requirements.

At step 204, the resource clustering engine 106 determines a performance metric 124 based on the set of requirements 120. A performance metric 124 is a characteristic that describes the performance of a resource cluster configuration 116. Examples of performance metrics 124 include, but are not limited to, processing times, response times, latency times, energy consumption, processor utilization, memory utilization, bandwidth utilization, throughput, and/or any other suitable type of performance metric 124. In one embodiment, the resource cluster engine 106 may be configured to use one or more predefined performance metrics 124 to evaluate the performance of a resource cluster. In another embodiment, the resource clustering engine 106 may identify one or more performance metrics 124 based on the set of requirements 120. For example, the resource clustering engine 106 may identify performance metrics 124 associated with processing times and latency times when the set of requirements 120 identifies a minimum response time. In another embodiment, the resource clustering engine 106 may determine a performance metric 124 based on information provided in the resource cluster request 118. For example, the resource cluster request 118 may identify one or more user-defined performance metrics 124.

At step 206, the resource clustering engine 106 generates a set of resource cluster configurations 116. In one embodiment, the resource clustering engine 106 may first identify which hardware resources that are currently available for allocation and then selects one or more of the available hardware resources for a resource cluster configuration 116. For example, the resource clustering engine 106 may periodically receive information about which hardware resource are currently available to be allocated to other network devices 102. The resource clustering engine 106 may randomly select different combinations of hardware resources for a resource cluster configuration 116. By randomly selecting different combinations of hardware resources, the resource clustering engine 106 is able to discover new combinations of hardware resources that may satisfy the set of requirements 120. The resource clustering engine 106 may select different type and/or amount of hardware resources for each resource cluster configuration 116. For instance, the resource clustering engine 106 may identify three processors having a first processor type for a first resource cluster configuration 116 and two processors having a second processor type for a second resource cluster configuration 116. Similarly, the resource clustering engine 106 determine which algorithms 110 or algorithm clusters 112 are currently available and then randomly selects one or more of the available algorithms 110 or algorithm clusters 112 for a resource cluster configuration 116. By randomly selecting different combinations of software resources, the resource clustering engine 106 is able to discover new combinations of software resources that may satisfy the set of requirements 120. The resource clustering engine 106 may select different types and/or amounts of algorithms 110 and algorithm clusters 112 for each resource cluster configuration 116. The resource clustering engine 106 may generate any suitable number of resource cluster configurations 116.

At step 208, the resource clustering engine 106 selects a resource cluster configuration 116 from among the set of resource cluster configurations 116. The resource clustering engine 106 iteratively selects resource cluster configurations 116 from among the set of resource cluster configurations 116 to evaluate.

At step 210, the resource clustering engine 106 simulates the selected resource cluster configuration 116. Here, the resource clustering engine 106 generate a test that simulates the selected resource cluster configuration 116 to determine the performance of the resource cluster configuration 116. For instance, the resource clustering engine 106 may generate a test environment that emulates the hardware resources and the software resources identified in the selected resource configuration 116. The resource clustering engine 106 then uses one or more sets of test data to simulate the operation of the hardware resources and the software resources from the selected resource configuration 116.

At step 212, the resource clustering engine 106 determines a performance value 126 for the selected resource cluster configuration 116 based on the simulation results 122 of the selected resource cluster configuration 116. The performance value 126 is a value that corresponds with the determined performance metric 124 in step 204. For example, the resource clustering engine 106 may have identified a response time as a performance metric 124 in step 204. In this example, the resource clustering engine 106 determines a performance value 126 corresponding with a response time based on the simulation results from step 210. As another example, the resource clustering engine 106 may determine a performance value 126 corresponding with a throughput based on the simulation results when a performance metric 124 associated with a packet size is determined in step 204. The resource clustering engine 106 may determine any suitable number of performance values 126. In some embodiments, a performance value 126 may indicate a raw value or measurement. For instance, a performance value may identify a time measurement in milliseconds. In other embodiments, a performance value 126 may be a value that indicates a performance level. In this case, the highest performance value from among a set of performance values indicates the best performance level (e.g. lowest amount of latency or power consumption).

At step 214, the resource clustering engine 106 determines whether to select another resource cluster configuration 116. Here, the resource clustering engine 106 determines whether all of the resource cluster configurations 116 from among the set of resource cluster configurations 116 have been simulated and evaluated. The resource clustering engine 106 determines to select another resource cluster configuration 116 when one or more of resource clusters 116 from among the set of resource cluster configurations 116 have not yet been evaluated. The resource clustering engine 106 returns to step 208 in response to determining to select another resource cluster configuration 116. In this case, the resource clustering engine 106 returns to step 208 to select another resource cluster configuration 116 to simulate and evaluate. Otherwise, the resource clustering engine 106 proceeds to step 216 in response to determining not to select another resource cluster configuration 116.

At step 216, the resource clustering engine 106 identifies a resource cluster configuration 116 from among the set of resource cluster configurations 116 based on the performance value 126 of the resource cluster configuration 116. Here, the resource clustering engine 106 may identify the resource cluster configuration 116 with the best performance value 126 from among the set of resource cluster configurations 116. In other words, the resource clustering engine 106 identifies which resource cluster configuration 116 provides the best performance for the set of requirements 120. For example, the resource clustering engine 106 may determine a first performance value 126 for a first resource cluster configuration 116 and a second performance value 126 for a second resource cluster configuration 116. The resource clustering engine 106 may compare the first performance value 126 and the second performance value 126 to determine which resource cluster configuration 116 provides the best performance. For instance, the resource clustering engine 106 may determine that the first performance value 126 is greater than the second performance value 126 which indicates that the first resource cluster configuration 116 provides better performance than the second resource cluster configuration 116.

Once the resource clustering engine 106 identifies the best performing resource cluster configuration 116, the resource clustering engine 106 will continue to modify the identified resource cluster configuration 106 to discover other configurations that further improves the performance of the resource cluster configuration 116. At step 218, the resource clustering engine 106 modifies the identified resource cluster configuration 116. The resource clustering engine 106 may modify the identified resource cluster configuration 116 by adding and/or removing elements (e.g. hardware resources and algorithms 110) from the identified resource cluster configuration 116. The resource clustering engine 106 may use a process similar to the process described in step 206 to select different hardware resources and/or software resources for modifying the identified resource cluster configuration 116. For example, the resource clustering engine 106 may randomly select one or more algorithms 110 or algorithm clusters 112 to replace one or more algorithms 110 from the identified resource cluster configuration 116.

At step 220, the resource clustering engine 106 simulates the modified resource cluster configuration 116. Here, the resource clustering engine 106 repeats the process performed in step 210 to emulate the modified resource cluster configuration 116 and to evaluate the performance of the modified resource cluster configuration 116.

At step 222, the resource clustering engine 106 determines a performance value 126 for the modified resource cluster configuration 116. The resource clustering engine 106 may determine the performance value 126 for the modified resource cluster configuration 116 using a process similar to the process described in step 212. In one embodiment, the resource clustering engine 106 uses the same performance metric 124 that was used in step 212 for determining a performance value 126. In another embodiment, the resource clustering engine 106 uses a different performance metric 124 than the one that is used in step 212 for determining a performance value 126. The resource clustering engine 106 may use different performance metrics 124 to evaluate other performance characteristics of the modified resource cluster configuration 116. In other embodiments, the resource clustering engine 106 may use any combination of the same or different performance metrics 124 for determining performance values 126.

At step 224, the resource clustering engine 106 determines whether to further modify the modified resource cluster configuration 116. In one embodiment, the resource clustering engine 106 may continue to modify the resource cluster configuration 116 until the performance value 126 associated with the resource cluster configuration 116 meets or exceeds a predetermined threshold value. For example, the set of requirements 120 may specify a threshold value corresponding with a maximum response time. In this example, the resource clustering engine 106 may continue modifying the resource cluster configuration 116 until the response time of the resource cluster configuration 116 is less than the threshold value.

In another embodiment, the resource clustering engine 106 may be configured to modify the resource cluster configuration 116 a predetermined number of times and then selects which modified configuration provides the best performance value 126. For example, the resource clustering engine 106 may generate ten different modified resource cluster configuration 116 and may identify which configuration provides the best performance from among the different modified resource cluster configurations 116.

In another embodiment, the resource clustering engine 106 may be configured to compare a performance value 126 of the current modified resource cluster configuration 116 to a performance value 126 for a previous modified resource cluster configuration 116. In this case, the resource clustering engine 106 may determine to continue modifying the current modified resource cluster configuration 116 when the performance value 126 of the current modified resource cluster configuration 116 is less than the performance value 126 of the previous modified resource cluster configuration 116. In this example, the resource clustering engine 106 may determine to discontinue modifying the current modified resource cluster configuration 116 when the performance value 126 of the current modified resource cluster configuration 116 is greater than the performance value 126 of the previous modified resource cluster configuration 116.

The resource clustering engine 106 returns to step 218 in response to determining to further modify the modified resource cluster configuration 116. In this case, the resource clustering engine 106 returns to step 218 to continue modifying the modified resource cluster configuration 116. Otherwise, the resource clustering engine 106 proceeds to step 226 in response to determining to not further modify the modified resource cluster configuration 116.

At step 226, the resource clustering engine 106 outputs the modified resource cluster configuration 116. For example, the resource clustering engine 106 may output the modified resource cluster configuration 116 by allocating system resources corresponding with the modified resource cluster configuration 116. In this case, the resource clustering engine 106 may provide or grant access for the network device 102 to use the resources identified in the modified resource cluster configuration 116. As another example, the resource clustering engine 106 may output the modified resource cluster configuration 116 by sending the modified resource cluster configuration 116 to the network device 102. In this case, the network device 102 may use the modified resource cluster configuration 116 to request hardware resources and software resources from the system 100. As another example, the resource clustering engine 106 may output the modifies resource cluster configuration 116 by associating the modified resource cluster configuration 116 with the set of requirements 120 and then storing the association in memory (e.g. memory 108). In this case, the resource allocation engine 106 is able to requirements 120 from a new resource cluster request 118 to quickly identify resource cluster configurations 116 that can either be used directly or as a guide for generating new resource cluster configurations 116.

Resource Cluster Chaining Process

Figure 3:
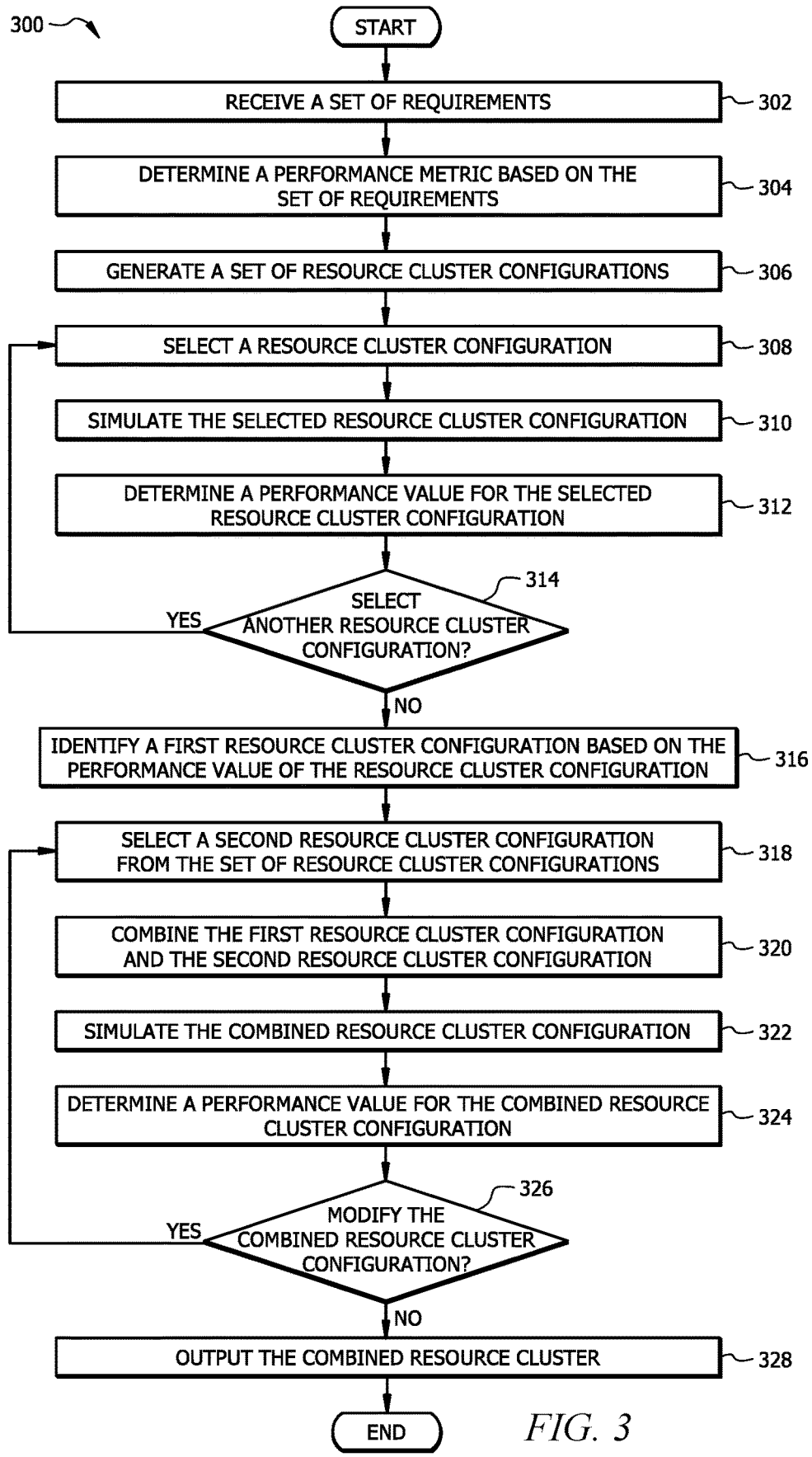
FIG. 3 is a flowchart of an embodiment of a resource cluster chaining method.

FIG. 3 is a flowchart of an embodiment of a resource cluster chaining method 300. The network device 104 may employ method 300 to generate a resource cluster chain that satisfies a set of requirements 120 specified by a user. A resource cluster chain comprises two or more resource clusters. Each resource cluster provides a set of hardware resources and software resources that provide some level of performance with respect to the set of requirements 120. The resource clustering is able to provide improved performance and efficiency by chaining together these individual resource cluster configurations 116 to provide a solution that satisfies the set of requirements 120. For example, the resource clustering engine 106 may generate a resource cluster chain that comprises multiple instances of the same resource cluster configuration 116 which enable some processes to be performed in parallel.

The following is a non-limiting example of how the network device 104 may implement method 300 to generate a resource cluster chain. At step 302, the resource clustering engine 106 receives a set of requirements 120. For example, the resource clustering engine 106 may receive the set of requirements 120 from a resource cluster request 118 that is sent to the network device 104. The set of requirements 120 may identify a minimum number of hardware resources, a maximum number of hardware resources, required hardware, hardware restrictions, software or algorithm restrictions, required algorithms, response times, latency times, packet size limitations, bandwidth limitations, and/or any other suitable type of requirement or limitation.

At step 304, the resource clustering engine 106 determines a performance metric 124 based on the set of requirements 120. The resource clustering engine 106 may determine the performance metric 124 using a process similar to the process described in step 204 of FIG. 2.

At step 306, the resource clustering engine 106 generates a set of resource cluster configurations 116. Here, the resource clustering engine 106 randomly selects different combinations of hardware resources and software resources that are currently available for allocation. For example, the resource clustering engine 106 may generate a set of resource cluster configurations 116 using a process similar to the process described in step 206 of FIG. 2. Once again, by randomly selecting different combinations of hardware and software resources, the resource clustering engine 106 is able to discover new combinations of resources that may satisfy the set of requirements 120.

At step 308, the resource clustering engine 106 selects a resource cluster configuration 116 from among the set of resource cluster configurations 116. The resource clustering engine 106 iteratively selects resource cluster configurations 116 from among the set of resource cluster configurations 116 to evaluate.

At step 310, the resource clustering engine 106 simulates the selected resource cluster configuration 116. Here, the resource clustering engine 106 simulates the selected resource cluster configuration 116 to determine its performance with respect to the set of requirements 120. For example, the resource clustering engine 106 may simulate the selected resource cluster configuration 116 using a process similar to the process described in step 210 of FIG. 2.

At step 312, the resource clustering engine 106 determines a performance value 126 for the selected resource cluster configuration 116 based on the simulation of the selected resource cluster configuration 116. For example, the resource clustering engine 106 may determine a performance value 126 for the selected resource cluster configuration 116 using a process similar to the process described in step 212 of FIG. 2.

At step 314, the resource clustering engine 106 determines whether to select another resource cluster configuration 116. Here, the resource clustering engine 106 determines whether all of the resource cluster configurations 116 from among the set of resource cluster configurations 116 have been simulated and evaluated. The resource clustering engine 106 determines to select another resource cluster configuration 116 when one or more of resource clusters 116 from among the set of resource cluster configurations 116 have not yet been evaluated. The resource clustering engine 116 returns to step 308 in response to determining to select another resource cluster configuration 116. In this case, the resource clustering engine 106 returns to step 308 to select another resource cluster configuration 116 to simulate and evaluate. Otherwise, the resource clustering engine 116 proceeds to step 316 in response to determining not to select another resource cluster configuration 116.

At step 316, the resource clustering engine 106 identifies a first resource cluster configuration 116 from among the set of resource cluster configurations 116 based on the performance value 126 of the resource cluster configuration 116. Here, the resource clustering engine 106 may identify the resource cluster configuration 116 with the best performance value 126 from among the set of resource cluster configurations 116. In other words, the resource clustering engine 106 identifies which resource cluster configuration 116 provides the best performance or results for the set of requirements 120. For example, the resource clustering engine 106 may determine a first performance value 126 for a first resource cluster configuration 116 and a second performance value 126 for a second resource cluster configuration 116. The resource clustering engine 106 may compare the first performance value 126 and the second performance value 126 to determine which resource cluster configuration 116 provides the best performance. For instance, the resource clustering engine 106 may determine that the first performance value 126 is greater than the second performance value 126 which indicates that the first resource cluster configuration 116 provides better performance than the second resource cluster configuration 116.

Once the resource clustering engine 106 identifies the best performing resource cluster configuration 116, the resource clustering engine 106 will modify the identified resource cluster configuration 106 by pairing it with other resource cluster configurations 116 to discover a resource cluster chain configuration that further improves the performance of the resource cluster configuration 116. At step 318, the resource clustering engine 106 selects a second resource cluster configuration 116 from among the set of resource cluster configurations 116. In one embodiment, the resource clustering engine 106 may identify the resource cluster configuration with the next best performance value 126 from among the set of resource cluster configurations 116. In another embodiment, the resource clustering engine 106 may iteratively select another resource cluster configuration 116 from among the set of resource cluster configurations 116. In one embodiment, the resource clustering engine 106 may select the second resource cluster configuration 116 from among a set of previously generated resource cluster configurations 116. For example, the resource clustering engine 106 obtain the second resource cluster configuration 116 from a repository (e.g. memory 108) of resource cluster configurations 116 that were previously generated based on other sets of requirements 120.

At step 320, the resource clustering engine 106 combines the first resource cluster configuration 116 and the second resource cluster configuration 116. Here, the resource clustering engine 106 generates a combined resource cluster configuration 116 by combining the hardware resources and the software resources that are in the first resource cluster configuration 116 and the second resource cluster configuration 116. In one embodiment, the resource clustering engine 106 may keep duplicative hardware and/or software resource from among the first resource cluster configuration 116 and the second resource cluster configuration 116 to allow for parallel processes to be performed. In another embodiment, the may remove duplicative hardware and/or software resource from among the first resource cluster configuration 116 and the second resource cluster configuration 116 to reduce the amount of resources that are consumed.

At step 322, the resource clustering engine 106 simulates the combined resource cluster configuration 116. Here, the resource clustering engine 106 repeats the process performed in step 310 to emulate the combined resource cluster configuration 116 and to evaluate the performance of the combined resource cluster configuration 116.

At step 324, the resource clustering engine 106 determines a performance value 126 for the combined resource cluster configuration 116. The resource clustering engine 106 may determine the performance value 126 for the combined resource cluster configuration 116 using a process similar to the process described in step 312. In one embodiment, the resource clustering engine 106 uses the same performance metric 124 that was used in step 312 for determining a performance value 126. In another embodiment, the resource clustering engine 106 uses a different performance metric 124 than the one that is used in step 312 for determining a performance value 126. The resource clustering engine 106 may use different performance metrics 124 to evaluate other performance characteristics of the combined resource cluster configuration 116. In other embodiments, the resource clustering engine 106 may use any combination of the same or different performance metrics 124 for determining performance values 126.

At step 326, the resource clustering engine 106 determines whether to modify the combined resource cluster configuration 116. The resource clustering engine 106 may determine whether to modify the combined resource cluster configuration 116 using a process similar to the process described in step 224 of FIG. 2. In one embodiment, the resource clustering engine 106 may repeat the process described in steps 318-324 to combine any suitable number of resource cluster configurations 116 together. The resource clustering engine 106 returns to step 318 in response to determining to modify the combined resource cluster configuration 116. In this case, the resource clustering engine 106 returns to step 318 to continue modifying the combined resource cluster configuration 116. Otherwise, the resource clustering engine 106 proceeds to step 328 in response to determining to not modify the combined resource cluster configuration 116.

At step 328, the resource clustering engine 106 outputs the combined resource cluster configuration 116. The resource clustering engine 106 may output the combined resource cluster configuration 116 using a process similar to the process described in step 226 of FIG. 2. The resulting combined resource cluster configuration 116 identifies the hardware resources and the software resources that are used to form a resource cluster chain.

Network Device Hardware Configuration

Figure 4:
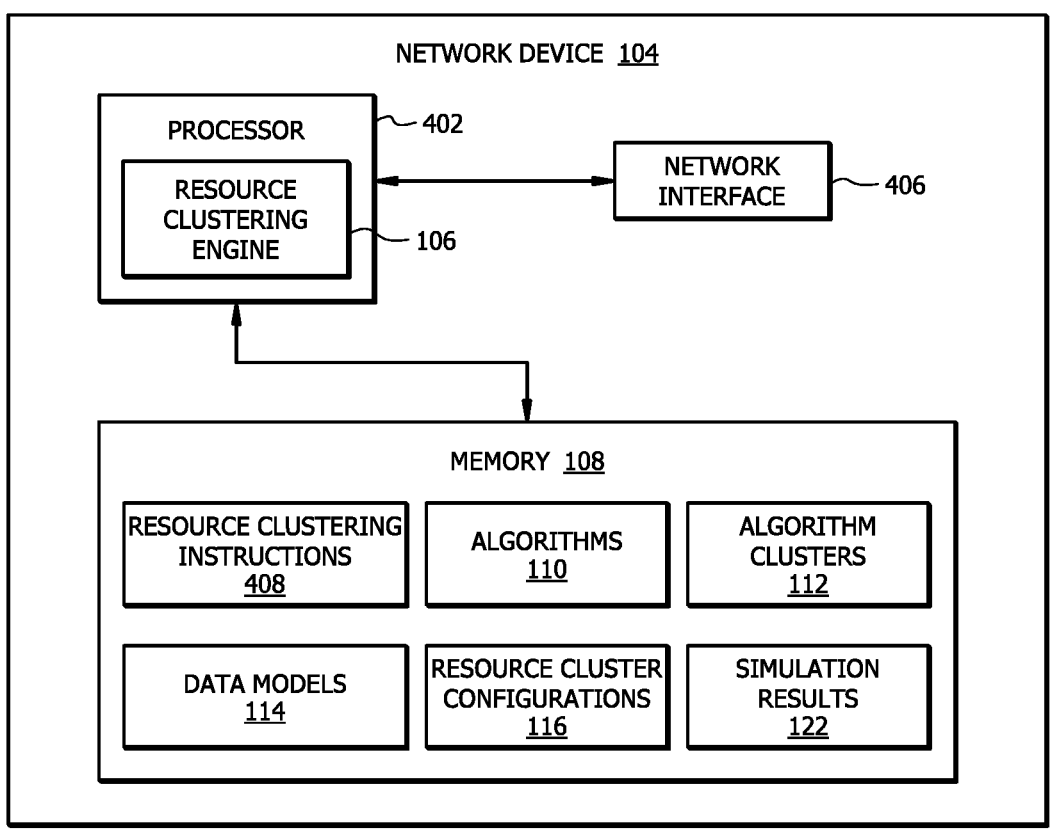
FIG. 4 is a schematic diagram of an embodiment of a device configured to generate and allocate hardware and software resources.

FIG. 4 is an embodiment of a device (e.g. network device 104) configured to generate and allocate hardware and software resources. The network device 104 comprises a processor 402, a memory 108, and a network interface 406. The network device 104 may be configured as shown or in any other suitable configuration.

The processor 402 comprises one or more processors operably coupled to the memory 108. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 108. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a resource clustering engine 106. In this way, processor 402 may be a special purpose computer designed to implement the functions disclosed herein. In an embodiment, the resource clustering engine 106 is implemented using logic units, FPGAs, ASICs, DSPs, or any other suitable hardware. The resource clustering engine 106 is configured operate as described in FIGS. 1-3. For example, the resource clustering engine 106 may be configured to perform the steps of method 200 and 300 as described in FIGS. 2 and 3, respectively.

The memory 108 comprises one or more disks, tape drives, or solid-state drives, and may be used as an over-flow data storage device, to store programs when such programs are selected for execution, and to store instructions and data that are read during program execution. The memory 108 may be volatile or non-volatile and may comprise read-only memory (ROM), random-access memory (RAM), ternary content-addressable memory (TCAM), dynamic random-access memory (DRAM), and static random-access memory (SRAM).

The memory 108 is operable to store resource clustering instructions 408, algorithms 110, algorithm clusters 112, data models 114, resource cluster configurations 116, simulation results 122, and/or any other data or instructions. The resource clustering instructions 408 may comprise any suitable set of instructions, logic, rules, or code operable to execute the resource clustering engine 106. The algorithms 110, the algorithm clusters 112, the data models 114, the resource cluster configurations 116, and the simulation results 122 are configured similar to the algorithms 110, the algorithm clusters 112, the data models 114, the resource cluster configurations 116, and the simulation results 122 described in FIGS. 1-3, respectively.

The network interface 406 is configured to enable wired and/or wireless communications. The network interface 406 is configured to communicate data between the network device 104 and other devices (e.g. network devices 102), systems, or domain. For example, the network interface 406 may comprise a WIFI interface, a LAN interface, a WAN interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A resource clustering device, comprising:
a memory operable to store a plurality of algorithms, wherein each algorithm is configured to perform one or more operations on data; and
a processor operably coupled to the memory, and configured to:
receive a set of requirements that identifies hardware operating characteristics;
determine a performance metric based on the set of requirements;
generate a set of resource cluster configurations by implementing different combinations of hardware resources and algorithms, wherein each resource cluster configuration identifies:
a set of hardware resources that are currently available for allocation; and
a set of algorithms from among the plurality of algorithms;
simulate each resource cluster configuration from among the set of resource cluster configurations;
determine a performance value corresponding with the performance metric for each resource cluster configuration based on simulation results for each resource cluster configuration;
identify a first resource cluster configuration having a first performance value with the highest performance value from among the set of resource cluster configurations;
select a second resource cluster configuration from among the set of resource cluster configurations;
combine hardware resources and algorithms for the first resource cluster configuration and the second resource cluster configuration to generate a combined resource cluster configuration;
simulate the combined resource cluster configuration;
determine a second performance value corresponding with the performance metric based on simulation results of the combined resource cluster configuration;
compare the first performance value to the second performance value;
determine whether the second performance value is greater than the first performance value;
generate a new combined resource cluster configuration by combining hardware resources and algorithms for the first resource cluster configuration with hardware resources and algorithms for a third resource cluster configuration from among the set of resource cluster configurations in response to a determination that the second performance value is less than the first performance value; and
output the combined resource cluster configuration in response to determining that the second performance value is greater than the first performance value, wherein outputting the combined resource cluster configuration comprises allocating resources corresponding with the combined resource cluster configuration by granting access for a network device to use the allocated resources.

2. The device of claim 1, wherein combining hardware resources and algorithms for the first resource cluster configuration and the second resource cluster configuration comprises removing duplicate hardware resources and algorithms.

3. The device of claim 1, wherein combining hardware resources and algorithms for the first resource cluster configuration and the second resource cluster configuration comprises preserving duplicate hardware resources and algorithms.

4. The device of claim 1, wherein the second resource cluster configuration is a copy of the first resource cluster configuration.

5. The device of claim 1, wherein:
receiving the set of requirements comprises receiving the set of requirements from a network device; and
outputting the combined resource cluster configuration comprises sending the combined resource cluster configuration to the network device.

6. The device of claim 1, wherein outputting the combined resource cluster configuration comprises:
associating hardware resources and algorithms for the combined resource cluster configuration with the set of requirements; and
storing the association between the combined resource cluster configuration and the set of requirements in the memory.

7. A resource clustering method, comprising:
receiving a set of requirements that identifies hardware operating characteristics;
determining a performance metric based on the set of requirements;
generating a set of resource cluster configurations by implementing different combinations of hardware resources and algorithms, wherein each resource cluster configuration identifies:
a set of hardware resources that are currently available for allocation; and
a set of algorithms from among a plurality of algorithms, wherein each algorithm is configured to perform one or more operations on data;
simulating each resource cluster configuration from among the set of resource cluster configurations;
determining a performance value corresponding with the performance metric for each resource cluster configuration based on simulation results for each resource cluster configuration;

identifying a first resource cluster configuration having a first performance value with the highest performance value from among the set of resource cluster configurations;

selecting a second resource cluster configuration from among the set of resource cluster configurations;

combining hardware resources and algorithms for the first resource cluster configuration and the second resource cluster configuration to generate a combined resource cluster configuration;

simulating the combined resource cluster configuration;

determining a second performance value corresponding with the performance metric based on simulation results of the combined resource cluster configuration;

comparing the first performance value to the second performance value; and outputting the combined resource cluster configuration in response to determining that the second performance value is greater than the first performance value, wherein outputting the combined resource cluster configuration comprises allocating resources corresponding with the combined resource cluster configuration by granting access for a network device to use the allocated resources.

8. The method of claim 7, wherein combining hardware resources and algorithms for the first resource cluster configuration and the second resource cluster configuration comprises removing duplicate hardware resources and algorithms.

9. The method of claim 7, wherein combining hardware resources and algorithms for the first resource cluster configuration and the second resource cluster configuration comprises preserving duplicate hardware resources and algorithms.

10. The method of claim 7, wherein the second resource cluster configuration is a copy of the first resource cluster configuration.

11. The method of claim 7, wherein:
receiving the set of requirements comprises receiving the set of requirements from a network device; and
outputting the combined resource cluster configuration comprises sending the combined resource cluster configuration to the network device.

12. The method of claim 7, wherein outputting the combined resource cluster configuration comprises:
associating hardware resources and algorithms for the combined resource cluster configuration with the set of requirements; and
storing the association between the combined resource cluster configuration and the set of requirements in the memory.

13. A computer program comprising executable instructions stored in a non-transitory computer readable medium that when executed by a processor causes the processor to:
receive a set of requirements that identifies hardware operating characteristics;
determine a performance metric based on the set of requirements;
generate a set of resource cluster configurations by implementing different combinations of hardware resources and algorithms, wherein each resource cluster configuration identifies:
a set of hardware resources that are currently available for allocation; and
a set of algorithms from among a plurality of algorithms, wherein each algorithm is configured to perform one or more operations on data;
simulate each resource cluster configuration from among the set of resource cluster configurations;
determine a performance value corresponding with the performance metric for each resource cluster configuration based on simulation results for each resource cluster configuration;
identify a first resource cluster configuration having a first performance value with the highest performance value from among the set of resource cluster configurations;
select a second resource cluster configuration from among the set of resource cluster configurations;
combine hardware resources and algorithms for the first resource cluster configuration and the second resource cluster configuration to generate a combined resource cluster configuration;
simulate the combined resource cluster configuration;
determine a second performance value corresponding with the performance metric based on simulation results of the combined resource cluster configuration;
compare the first performance value to the second performance value;
determine whether the second performance value is greater than the first performance value;
generate a new combined resource cluster configuration by combining hardware resource and algorithms for the first resource cluster configuration with hardware resources and algorithms for a third resource cluster configuration from among the set of resource cluster configurations in response to a determination that the second performance value is less than the first performance value; and
output the combined resource cluster configuration in response to determining that the second performance value is greater than the first performance value, wherein outputting the combined resource cluster configuration comprises allocating resources corresponding with the combined resource cluster configuration by granting access for a network device to use the allocated resources.

14. The computer program of claim 13, wherein combining hardware resources and algorithms for the first resource cluster configuration and the second resource cluster configuration comprises removing duplicate hardware resources and algorithms.

15. The computer program of claim 13, wherein combining hardware resources and algorithms for the first resource cluster configuration and the second resource cluster configuration comprises preserving duplicate hardware resources and algorithms.

16. The computer program of claim 13, wherein the second resource cluster configuration is a copy of the first resource cluster configuration.

17. The computer program of claim 13, wherein outputting the combined resource cluster configuration comprises:
associating hardware resources and algorithms for the combined resource cluster configuration with the set of requirements; and
storing the association between the combined resource cluster configuration and the set of requirements in the memory.

* * * * *